Н3,033,826
Patented May 8, 1962

3,033,826
LINEAR POLYESTERS OF 1,4-CYCLOHEXANEDI-METHANOL AND AMINO-CARBOXYLIC ACIDS
Charles J. Kibler, Alan Bell, and James G. Smith, Kingsport, Tenn., assignors to Eastman Kodak Company, Rochester, N.Y., a corporation of New Jersey
No Drawing. Filed June 29, 1959, Ser. No. 823,295
19 Claims. (Cl. 260—76)

This invention relates to highly polymeric linear condensation polymers of at least three constituents as follows: 1,4-cyclohexanedimethanol (cis or trans isomers), a dicarboxylic acid and an aminocarboxylic acid. These polymers are valuable as fibers, films, molded articles, coating materials, etc., and are characterized by excellent overall properties including high melting temperatures, hydrolytic stability, etc.

This application is a continuation-in-part of Kibler et al. Serial No. 554,639, filed December 22, 1955, now U.S. Patent No. 2,901,666, granted on August 25, 1959, wherein the claims cover polyesters generically as well as polyester-amides wherein one of the constituents is a diamine. Kibler et al. Serial No. 823,298, filed on even date herewith covers polymers wherein one of the principal constituents is a hydroxycarboxylic acid. Kibler et al. Serial No. 823,296, filed on even date herewith covers polymers wherein one of the principal constituents is an aminoalcohol. Kibler et al. Serial No. 823,297, filed on even date herewith covers relatively low molecular weight polymers, especially polyesters, which are useful as plasticizers, lubricants, etc. The specification and file history of the parent application discusses the prior art and the unobviousness of the subject matter of these inventions.

The properties of the polymers of the present invention include unexpectedly high melting temperatures, chemical stability, physical stability, dyeability, etc. More specific properties include weather resistance, resistance to heat distortion, hydrolytic stability which is an important factor in weathering, utility as a dielectric or as to other electrical properties under humid conditions, dyeability to deep shades without the use of a carrier, etc.

The objects of the present invention iclude providing polymers of the components mentioned above having the advantageous properties enumerated as well as products produced therefrom as described. Other objects will become apparent elsewhere herein.

According to a preferred embodiment of this invention polymers are provided which are linear highly polymeric condensation polymers of (A) at least one dibasic carboxylic acid, (B) at least one bifunctional dihydroxy compound and (Z) at least one aminocarboxylic acid, the relative proportions of (A), (B) and (Z) constituents being such as to constitute a linear polyester amide in which at least 50 mole percent of said component (B) consists of at least one member selected from the group consisting of the cis and trans isomers of 1,4-cyclohexanedimethanol, which polymer melts at above 100° C. and below about 330° C., has an inherent viscosity of at least 0.4 as measured in a mixture of 40% tetrachlorethane plus 60% phenol and is capable of being formed into fibers.

Generally the inherent viscosity of the polymers of this invention lie in the range of 0.4–2.0 although higher or lower values are also contemplated.

The bifunctional reactants or constituents which are employed to prepare the polymers of this invention contain no other reactive (functional) substituents which would interfere with the formation of linear polymers as defined by Carothers in his earlier work in this field. Such bifunctional reactants and the methods for preparing polymers from them are well known in the art and illustrated in numerous patents and in the literature as well as in the parent patent application of which this is a continuation-in-part.

As used in this specification the term 1,4-cyclohexanedimethanol includes either or a mixture of both cis and trans isomers. The preferred usage is at least 50 percent of the trans isomer. The letters CHDM have the same meaning. A useful mixture of isomers is about 70% trans plus 30% cis.

Examples of the constituents which constitute the polymers of this invention include constituents designated above as (A), (B) and (Z), with possible minor amounts but preferably none of (X) and (Y) constituents as follows:

(A) DIBASIC CARBOXYLIC ACIDS

These include aromatic, aliphatic, heterocyclic and other types and include cycloaliphatic, acyclic, hexacarbocyclic, tetracarbocyclic, bicyclic, etc. Examples include terephthalic, cyclohexanedicarboxylic, succinic, naphthalenedicarboxylic, norcamphanedicarboxylic, carbonic, dimerized fatty acids, trimerized fatty acids, p-carboxycarbanilic, suberic, azelaic, adipic, sebacic, glutaric, dimethylmalonic, α-ethylsuberic, oxalic, α,α-diethyl adipic, dicarboxy diethyl ether, ortho-phthalic, hexahydro-o-phthalic, sulfonyldipropionic, and many other such acids. Examples of especially preferred hexacarbocyclic dicarboxylic acids wherein the carboxy radicals are attached to a hexacarbocyclic nucleus in para relationship include terephthalic acid, trans-1,4-cyclohexanedicarboxylic acid, p,p-sulfonyldibenzoic acid, 4,4'-diphenic acid, 4,4'-benzophenonedicarboxylic acid and 1,2-di(p-carboxyphenyl) alkanes (1 to 10 carbons). Such acids as are contemplated by constituent (A) generally contain from about 1 to 40 carbon atoms.

(B) DIHYDROXY COMPOUNDS

These include aromatic, aliphatic, heterocyclic and other types as in regard to constituent (A). Preferably the hydroxy radicals are atached to a methylene group as in a glycol, i.e., the compound is a dihydroxymethyl compound such as ethylene glycol, 1,10-decanediol, neopentyl glycol, 1,4-bishydroxymethylbenzene, norcamphanedimethanol, etc. Other dihydroxy compounds include hydroquinone, dihydroxynaphthalene, resorcinol, etc. Such compounds generally contain from 2 to 20 carbon atoms if they are monomeric in nature; however, the dihydroxy compounds contemplated also include the polyethylene glycols, other low polymers which are bifunctional and may contain internal ether, thioether, sulfone, carboxy, urethane and other linkages such as polystyrene which has been hydroxylated so as to acquire two hydroxy radicals. Any such polymeric dihydroxy compounds preferably have a molecular weight of less than 10,000, most preferably from about 700 to about 7,500. Additional specific examples include 2-methyl-1,5-pentanediol, diethylene glycol, triethylene glycol, 2,2-dimethyl-3-isopropyl-1,3-propanediol, etc.

As already pointed out constituent (B) is composed of at least 50 mole percent of CHDM, whereby the advantageous results of this invention are accomplished.

(X) HYDROXYCARBOXYLIC ACIDS

These include aromatic, aliphatic, heterocyclic and other types as in regard to constituent (A) and include lactones. Specific examples include 2,2-dimethyl-3-hydroxypropionic acid, its cyclic lactone, pivalolactone, omega-hydroxycaproic acid, juniperic acid also known as omega-hydroxypalmitic acid, butyrolactone, 4-hydroxybutyric acid, 4($\beta$-hydroxyethyl)benzoic acid, 2 ($\beta$-hydroxyethoxy)benzoic acid, 4-hydroxymethylbenzoic acid, 4-hydroxymethylcyclohexanecarboxylic acid, 4-($\beta$-hydroxyethoxy)cyclohexanecarboxylic acid, etc. Generally these hydroxycarboxylic acids contain from 2 to 20 carbon atoms.

(Y) AMINOALCOHOLS

These include aromatic, aliphatic, heterocyclic and other types as in regard to constituent (A). Specific examples include 5-aminopentanol-1, 4-aminomethylcyclohexanemethanol, 5-amino-2-ethylpentanol-1, 2-(4-$\beta$-hydroxyethoxyphenyl)-1-aminoethane, 3-amino-2,2-dimethylpropanol, hydroxyethylamine, etc. Generally these aminoalcohols contain from 2 to 20 carbon atoms.

(Z) AMINOCARBOXYLIC ACIDS

These include aromatic, aliphatic, heterocyclic, and other types as in regard to constituent (A) and include lactams. Specific examples include 6-aminocaproic acid, its lactam known as caprolactam, omega-amino-undecanoic acid, 3-amino-2,2-dimethylpropionic acid, 4-($\beta$-aminoethyl)benzoic acid, 2-($\beta$-aminopropoxy)benzoic acid, 4-aminomethylcyclohexanecarboxylic acid, 2-($\beta$-aminopropoxy)-cyclohexanecarboxylic acid, etc. Generally these compounds contain from 2 to 20 carbon atoms.

The molar proportions of the various constituents in the polymers of this invention are apparent to those skilled in the art. Generally speaking there are equal molar proportions of (1) the A constituent and (2) the sum of the B and Y constituents. The sum total of the molar quantities of X, Y and Z are advantageously no greater than 60% of the molar amount of the A constituent; however, the Y constituent never exceeds the B constituent. According to the present invention constituent Z is from about 10 to 60 mole percent of constituent A, the sum of constituents X and Y is from 0 to 10 mole percent of constituent A and the molar amount of constituent B is reduced by the molar amount of constituent Y (if any).

The preparation of the polymers can be accomplished by melt phase or solid phase techniques as described in the parent application, in the prior art and in the examples below. The methods for forming fibers, film, molded products are similarly apparent.

This invention can be further illustrated by the following examples of preferred embodiments, although it will be apparent that these examples are included merely for purposes of illustration and are not intended to limit the scope of the invention unless otherwise specifically indicated.

Example 1

A flask was charged with a mixture of 17.5 grams (0.09 mole) dimethyl terephthalate, 3.4 grams (0.03 mole) caprolactam, 25 grams (0.12 mole) 1,4-cyclohexanedimethanol containing 30% methanol, 1.0 ml. of a solution of lithium methoxide in methanol (4×10⁻⁴ mole per ml.) and 0.2 ml. of a 28.4% solution of titanium tetraisopropoxide in n-butanol. The mixture was stirred under nitrogen and heated at 200–210° C. for one hour. During this time the methanol from the 1,4-cyclohexanedimethanol flashed off and the alcoholysis reaction proceeded smoothly. The temperature was then raised to 285° C. over a twenty-five minute period, and as soon as the temperature reached 285° C., a vacuum of less than 0.5 mm. of mercury was applied and the residual polymer heated and stirred at 280–285° C. and 0.2 to 0.1 mm. of mercury for one hour. The product was a viscous melt. On cooling the polymer was found to have a viscosity of 0.81 and a melting point of 283–287° C.

This polymer was readily melt spun to fibers with a flow point (0.2 g./d.) of 248° C. a tenacity of 3.5 g./d. and an elongation of 17%. A fabric of this fiber was readily dyed with the acid dyes used for nylon fabrics. This polymer was also useful for films and molding resins.

Example 2

The procedure described in Example 1 was repeated. After the vacuum has been applied for 7 minutes, the low molecular weight molten prepolymer was covered with an atmosphere of nitrogen and poured into water. The transparent, almost colorless resin was air dried and pulverized to pass a 40 mesh screen. A thin layer of this material was heated at 250° C. and 0.07 mm. of mercury for 4 hours. The final polymer had a viscosity of 0.93. It formed valuable films, fibers and molding resins.

Example 3

This example describes the "stepwise" preparation of the composition of Example 1 as well as a solid phase polymerization.

A flask was charged with 35 grams (0.18 mole) of dimethyl terephthalate, 6.8 grams (0.06 mole) of caprolactam and 2.0 ml. of a solution of lithium methoxide in methanol (4×10⁻⁴ mole per ml.). The mixture was stirred under nitrogen at 200° C. for one hour. It was then cooled, 49.5 grams (0.24 mole) 1,4-cyclohexanedimethanol containing 30% methanol and 0.4 ml. of a 28.4% solution of titanium tetraisopropoxide in n-butanol were added. The mixture was then reheated at 200° C. until the ester interchange was complete. The temperature was then raised to 285° C. over a forty-minute period and a vacuum of less than 0.5 mm. applied for seven minutes. The vacuum was replaced with an atmosphere of nitrogen and the molten prepolymer poured into water. The product had a viscosity of 0.24 and melted at 275–277° C. This material was ground to pass a 40 mesh screen, heated at 260° C., 0.06 mm. of mercury pressure for three hours. The final polymer had a viscosity of 0.98 and melted at 287–295° C.

An analogous compound was prepared from dimethyl terephthalate, ethylene glycol and caprolactam and the hydrolytic stability of these two compounds compared by means of the viscosity breakdown of polyester films at 110° C. and 100% relative humidity. The polyesteramide prepared from 1,4-cyclohexanedimethanol proved to be appreciably more stable to hydrolysis than the one prepared from ethylene glycol and the polymer of this invention was also superior in other regards as explained above.

Example 4

The procedure described in Example 3 was repeated. However, after the vacuum was applied, stirring and heating under vacuum was continued for ninety minutes. Throughout this period, the polymer became progressively more viscous. It finally wrapped about the stirrer and pulled away from the walls of the flask.

The vacuum was then replaced with nitrogen and the polymer cooled. It had a viscosity of 0.78.

The following table summarizes other polyester compositions prepared by the methods describd in Examples 1 through 4 and using 1,4-cyclohexanedimethanol as the diol.

TABLE

| Example | Method | (a) Dibasic Acid (b) Aminoacid | Moles | Polymer I.V. | Polymer M.P., °C. |
|---|---|---|---|---|---|
| 5 | C | (a) Terephthalic (b) 4-aminobenzoic | 1.0 0.25 | 0.87 | 278-285 |
| 6 | B | (a) trans-Hexahydro terephthalic (b) 6-aminocaproic | 1.0 0.11 | 0.92 | 200-203 |
| 7 | B | (a) 4,4'-Sulfonyldibenzoic (b) 6-aminocaproic | 1.0 0.25 | 0.87 | 280-290 |
| 8 | A | (a) Terephthalic (b) -aminoundecanoic | 1.0 0.50 | 1.34 | 220-227 |
| 9 | B | (a) Terephthalic (b) 4-aminomethylcylclohexanecarboxylic | 1.0 0.11 | 0.75 | 288-293 |
| 10 | D | (a) trans-Hexahydroterephthalic (b) 4-aminomethylcyclohexanecarboxylic | 1.0 0.11 | 0.73 | 212-223 |
| 11 | C | (a) Terephthalic (b) 4-( -aminopropoxy)-benzoic | 1.0 0.25 | 0.86 | 283-288 |

Method A—Melt phase preparation as described in Example 1.
Method B—Solid phase preparation as described in Example 2.
Method C—Stepwise preparation and solid phase polymerization as described in Example 3.
Method D—Stepwise preparation and melt phase polymerization as described in Example 4.

Polymers as described above were formed into fibers which could be oriented by stretching to improve their properties if desired, especially for textile fabrics. Similarly they can be extruded to form films which can be biaxially oriented. Such films have utility for photographic purposes, wrapping materials, dielectrics, etc. Molding compositions can also be prepared from such polymers. In any of these forms the polymers are receptive to dyes without carriers. They are especially resistant to weathering. An outstanding property is their hydrolytic stability in combination with an unusually well balanced group of other desirable properties.

Although the invention has been described in considerable detail with reference to certain preferred embodiments thereof, it will be understood that variations and modifications can be effected without departing from the spirit and scope of the invention as defined in the appended claims.

We claim:

1. A linear highly polymeric polyesteramide of (A) a dicarboxylic acid, (B) a bifunctional dihydroxy component and (Z) a mono-amino-mono-carboxylic acid, the relative proportions of (A), (B) and (Z) constituents being such that constituents (A) and (B) are present in equimolecular amounts, constituent (Z) is from about 10 to 60 mole percent of constituent (A) and in which at least 50 mole percent of said constituent (B) consists of at least one member selected from the group consisting of the cis and trans isomers of 1,4-cyclohexanedimethanol, which polyesteramide melts at above 100° C. and below 330° C., has an inherent viscosity of at least 0.4 as measured in a mixture of 40 tetrachlorethane plus 60% phenol and is capable of being formed into fibers.

2. A polymer as defined by claim 1 wherein the constituents are: (A) is terephthalic acid, (B) is 1,4-cyclohexanedimethanol, and (Z) is 6-aminocaproic acid.

3. A polymer as defined by claim 1 wherein the constituents are: (A) is terephthalic acid, (B) is 1,4-cyclohexanedimethanol and (Z) is 4-aminobenzoic acid.

4. A polymer as defined by claim 1 wherein the constituents are: (A) is terephthalic acid, (B) is 1,4-cyclohexanedimethanol and (Z) is 4-aminomethylcyclohexanecarboxylic acid.

5. A polymer as defined by claim 1 wherein the constituents are: (A) is trans hexahydroterephthalic acid, (B) is 1,4-cyclohexanedimethanol and (Z) is 6-aminocaproic acid.

6. A polymer as defined by claim 1 wherein the constituents are: (A) is trans hexahydroterephthalic acid, (B) is 1,4-cyclohexanedimethanol and (Z) is 4-aminomethylcyclohexanecarboxylic acid.

7. A polymer as defined by claim 1 wherein the 1,4-cyclohexanedimethanol is from 50 to 100% trans isomer.

8. A polymer as defined by claim 7 wherein at least 50 mole percent of constituent (A) is a hexacarboxylic dicarboxylic acid wherein the carboxy radicals are attached to a hexacarboxylic nucleus in a para relationship.

9. A fiber of a polymer as defined by claim 1.
10. A fiber of a polymer as defined by claim 2.
11. A fiber of a polymer as defined by claim 3.
12. A fiber of a polymer as defined by claim 4.
13. A fiber of a polymer as defined by claim 5.
14. A fiber of a polymer as defined by claim 6.
15. A film of a polymer as defined by claim 1.
16. A film of a polymer as defined by claim 2.
17. A film of a polymer as defined by claim 3.
18. A film of a polymer as defined by claim 4.
19. A film of a polymer as defined by claim 5.

References Cited in the file of this patent
UNITED STATES PATENTS
2,901,466        Kibler ---------------- Aug. 25, 1959

UNITED STATES PATENT OFFICE
CERTIFICATE OF CORRECTION

Patent No. 3,033,826                                May 8, 1962

Charles J. Kibler et al.

It is hereby certified that error appears in the above numbered patent requiring correction and that the said Letters Patent should read as corrected below.

Column 6, line 34, for "hexacarboxylic" read -- hexacarbocylic --.

Signed and sealed this 11th day of September 1962.

(SEAL)
Attest:

ERNEST W. SWIDER
Attesting Officer

DAVID L. LADD
Commissioner of Patents